| United States Patent [19] | [11] Patent Number: 4,973,608 |
|---|---|
| Krippl et al. | [45] Date of Patent: Nov. 27, 1990 |

[54] PROCESS AND APPARATUS FOR CHARGING A LIQUID REACTANT WITH GAS

[75] Inventors: Kurt Krippl, Monheim; Klaus Schulte, Leverkusen, both of Fed. Rep. of Germany

[73] Assignee: Bayer Aktiengesellschaft, Bayerwerk, Fed. Rep. of Germany

[21] Appl. No.: 316,381

[22] Filed: Feb. 27, 1989

[30] Foreign Application Priority Data

Mar. 11, 1988 [DE] Fed. Rep. of Germany ....... 3808082

[51] Int. Cl.$^5$ .............................. C08J 9/12; B01J 8/18
[52] U.S. Cl. ...................................... 521/50; 521/133; 521/170; 422/133
[58] Field of Search .......................... 521/50, 133, 170

[56] References Cited

U.S. PATENT DOCUMENTS

| 4,590,218 | 5/1986 | Vass | 521/50 |
| 4,764,536 | 8/1988 | Proksa et al. | 521/50 |
| 4,777,186 | 10/1988 | Stang et al. | 521/50 |

FOREIGN PATENT DOCUMENTS 0175252 3/1986 European Pat. Off. .
3434443 3/1986 Fed. Rep. of Germany .

OTHER PUBLICATIONS

Kunststoffe, 1984, No. 11, pp. 659-660.

*Primary Examiner*—John Kight, III
*Assistant Examiner*—Dennis R. Daley
*Attorney, Agent, or Firm*—Joseph C. Gil

[57] ABSTRACT

The present invention is directed to a novel process and apparatus for charging a liquid reactant with a gas. In the process, the liquid reactant which is as yet uncharged with gas is introduced into the gassing tank at a point just below the substantially constant liquid level of the reactant. When the reactant has been charged with gas, it is removed at a point below the region where gassing takes place. A three-layered arrangement is thereby established and maintained in the gassing tank so that the layer of gas is separated from the layer of gas charged component by the layer of uncharged component. The gas charged component is thus maintained at a density corresponding to the desired gas content, taking into account any significant starting conditions, such as the original density, the temperature and the pressure. If necessary, this density is maintained by suitably varying the stirrer speed.

7 Claims, 2 Drawing Sheets

4,973,608

PROCESS AND APPARATUS FOR CHARGING A LIQUID REACTANT WITH GAS

BACKGROUND OF THE INVENTION

This invention relates to a process and an apparatus for charging at least one liquid reactant with gas, especially in small quantities, for the production of foams, and in particular polyurethane foams. The reactant is continuously introduced into a gassing tank which is under pressure and in which a gas cushion is maintained in the upper region. Gas is absorbed from the upper region via a hollow stirrer which disperses the gas in the liquid which is situated below the stirrer in the lower region of the gassing tank. The reactant, now charged with gas, is then removed from the gassing tank for further processing.

It is well known that for the production of foams, a certain gas content, which varies according to the chemical system of the reactants, assists the cell formation. For the production of polyurethane foams from polyols and isocyanates, it is generally the polyol component which is charged with gas because the polyol generally has the higher viscosity.

It has hitherto been considered that the best way to assist the foaming reaction is to charge the component with as much gas as possible. In RIM systems (reaction injection molding) in particular, the polyol component is charged with 20 to 70 volume % of gas. A reaction mixture which is charged with gas has improved flow properties, expands more uniformly and in the mold exerts a pressure from within which prevents the formation of surface defects such as cavities in the finished molded product.

Processes and apparatus have therefore been developed for dispersing as much gas as possible in at least one of the reactants. Thus it is known, for example, (European Pat. Application 175,252; and "Kunststoffe" (1984) Number 11, pages 659/660) to charge a reactant intermittently with gas by connecting a storage tank to a small gassing vessel equipped with a hollow stirrer which absorbs gas from a gas cushion maintained in the upper region of the gassing tank. Gas is dispersed in the reactant below the gas cushion via the perforated stirrer blades. In this arrangement, the component is kept in circulation by a pumping action. The density is continuously determined as a measure of the amount of gas charged. The hollow stirrer is shut off when the density reaches the required value and is switched on again as soon as the density rises above this value. This technique is unsuitable for dispersing small quantities of gas in a component because the amount of gas introduced cannot be controlled with sufficient accuracy. The gassed component in the storage tank must be stirred to maintain homogeneity but stirring causes small gas bubbles to unite to form larger bubbles so that the component contains a wide range of sizes of bubbles. This is particularly disadvantageous for cell formation.

A continuous process has been described, a so-called on-line process (German Offenlegungsschrift No. 3,434,443), in which a gassing container is connected to the conduit leading from the storage tank to the mixing head. Here again, a hollow stirrer absorbs gas from an air cushion in the upper region of the gassing tank. This gassing tank is designed as a continuous flow tank, i.e. the component which has not yet been gassed is introduced into the lower part of the container and removed from the middle region after it has been charged with gas, but a true circulation is not maintained. In this process, the component charged with gas has contact with the gas cushion. At low gas charges, it is impossible to ensure that the gas content will be kept constant at the required level due to diffusion at the interface between the gas cushion and the gas charged reactant. Since high stirrer speeds and flow breakers are in most cases still employed for achieving high gas charges, the diffusion in these cases is even more pronounced due to the vigorously swirled up surface of the liquid reactant in the tank. This method is therefore also unsuitable for dispersing relatively small quantities of gas in a reactant.

The problem arises of finding a process and an apparatus whereby small quantities of gas, and in particular quantities below 10 volume %, based on the total volume of the gassed component, can be dispersed in at least one of the liquid reactants for the production of a foam in such a manner that the gas content is kept constant at the desired level.

DESCRIPTION OF THE INVENTION

Figure 1:
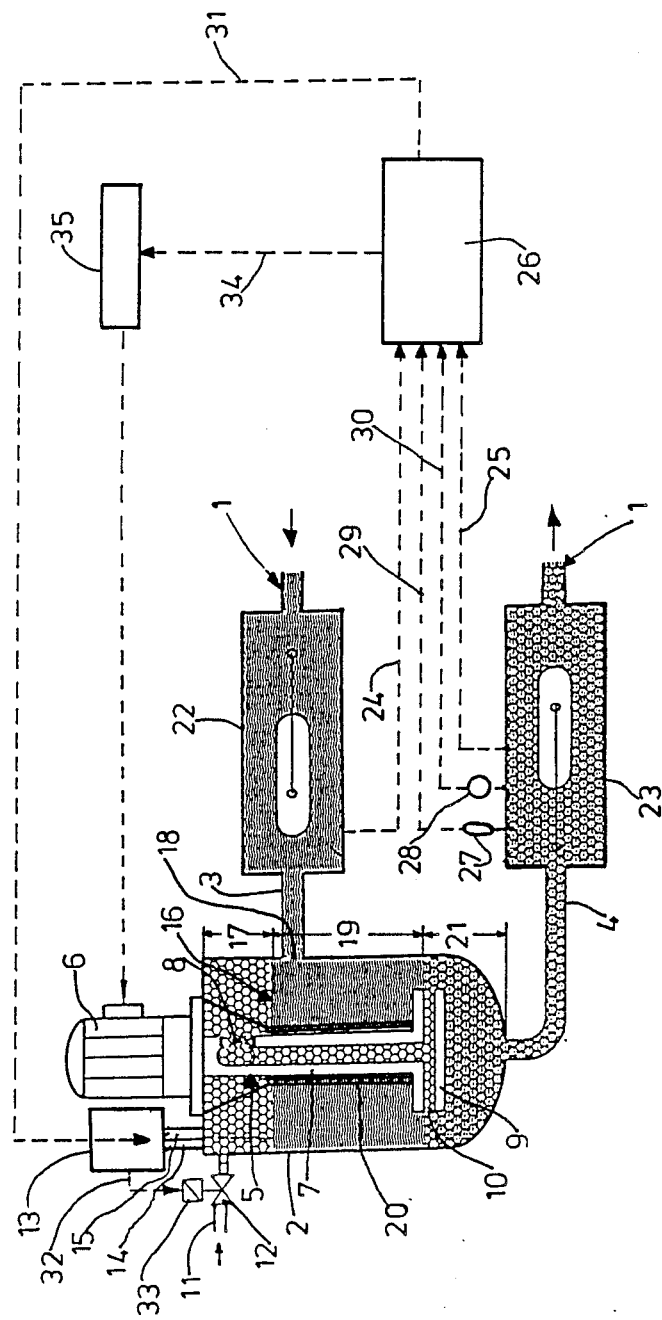
FIG. 1 is a schematic illustration of the layout of the apparatus.

To solve the above-noted problem, the liquid reactant which is as yet uncharged with gas is introduced into the gassing tank at a point just below the substantially constant liquid level of the reactant. When the reactant has been charged with gas, it is removed at a point below the region where gassing takes place. A three-layered arrangement is thereby established and maintained in the gassing tank so that the layer of gas is separated from the layer of gas charged component by the layer of uncharged component. The gas charged component is thus maintained at a density corresponding to the desired gas content, taking into account any significant starting conditions, such as the original density, the temperature and the pressure. If necessary, this density is maintained by suitably varying the stirrer speed.

Introducing the ungassed reactant at a point just below the liquid level causes the uppermost layer to be continuously replaced so that no time is left for diffusion of gas into the liquid. The point of introduction should be as close as possible below the liquid level but at the same time a sufficient distance is necessary to prevent swirling movements at the interface with the gas cushion. It is completely unexpected to find that the gas charged component, which has a lower specific gravity, remains in the lower region of the container. It is evidently enough for the force with which the gassed component is drawn off to at least counter-balance the rising tendency of the gassed component. The as yet ungassed intermediate layer which does not, of course, have a sharp boundary with the gassed layer, prevents any diffusion between the gas cushion and the said component and thereby eliminates a troublesome source of error encountered in the known processes. It is essential to take into account the starting conditions, and in particular the density, pressure and temperature. Using the ungassed or completely degasified component under various conditions of pressure and temperature as a basis, any desired gas content can be corollated with the corresponding density. The difference between the original density and the density of the gas charged component is a measure of the additional quantity of gas dispersed in the component. If fluctuations in the initial density, pressure and temperature occur in the course of the process, then the speed of rotation of the stirrer is adjusted to keep the gas content constant over the entire operating time. Changes in the initial conditions need only be taken into account if they are large enough to be significant. This is generally the case when the gas content is low. After the liquid reactant has been charged with gas and, as far as possible, the charged component should undergo no pressure drop until it has been mixed with the second reactant.

The interface between the gas cushion and the reactant is preferably kept as small as possible. Diffusion is thereby almost completely prevented. At the same time, equalization of pressure between the gas cushion and the reactant in the gas tank is possible.

According to another special embodiment of the new invention, the liquid reactant is shielded against the rotation of the stirrer shaft. This prevents the formation of a funnel which could draw uncontrolled amounts of gas into the reactant.

Introduction of the component which is not yet charged with gas is preferably carried out by continuously renewing the whole layer of reactant situated at the interface with the gas cushion. This is achieved by introducing the component as a very wide, flat stream, and optionally by using several inlets.

According to another special embodiment, the hollow stirrer is operated at speeds of up to a maximum of 1200 revolutions per minute. It has surprisingly been found that against all expectations, the gas is dispersed much more finely in the reactant if the speed of rotation of the stirrer is not too high. A narrow range of bubble sizes is thereby advantageously achieved.

A stream which is produced only by the inflow, the outflow and the action of the hollow stirrer but is otherwise undisturbed is advantageously maintained in the gassing tank. This is achieved by dispensing with the flow breaker which has conventionally been used in gassing tanks. The ratio of the diameter of the gassing tank to the diameter of the circle described by the hollow stirrer should be such that the contents of the tank do not take part in the rotation.

The liquid level of the reactant in the gassing tank is preferably kept constant, at least between two limiting values, by the supply of gas. Whether the level is kept as constant as possible or is kept between two limiting values is primarily a question of technical outlay but the limiting values should be sufficiently close together not to constitute sources of error.

The new apparatus for charging at least one liquid reactant with gas is based on a gassing tank which is to be attached to a conduit leading from a storage tank to a mixing head. The gassing tank is equipped with a hollow stirrer which has an intake opening in the upper region within the gassing tank and stirrer blades with gas outlet openings in the lower region of the gassing tank. A gas supply pipe opens into the upper region of the gassing tank. The novel feature of the present invention is that the gassing tank has a filling level regulator for controlling the liquid level of the reactant, which regulator is associated with an activator drive of a shut off valve in the gas supply duct by way of a pulse lead. The opening of the feed pipe for the as yet ungassed reactant is situated just below the liquid level of the reactant. The outlet opening into the discharge duct for the reactant charged with gas is situated below the stirrer blades. Density measuring instruments are arranged both in the inlet pipe and in the discharge pipe, which measuring instruments are connected by pulse leads to a computer and control apparatus which in turn is connected to the speed adjustable drive of the hollow stirrer by a pulse lead.

The filling level regulator serves to replace the spent gas while the rate of inflow of ungassed reactant remains substantially constant. The opening of the inlet pipe at a level just below the liquid level ensures that the uppermost layer is constantly replaced. Since the opening into the discharge pipe for gassed reactant is situated below the hollow stirrer, preferably centrally in the base of the container, the gassed reactant can no longer come into contact with the gas cushion and optimum flow conditions are obtained. The density measuring instruments in the inflow duct and outflow duct enable the changes in density due to gassing to be determined and allow for the measurement of the effective gas content of the charged reactant after the gassing process. The computer and control apparatus enables the measured values to be compared with the required values, taking into account the initial conditions of density, temperature and pressure. If these initial values fluctuate in the course of the operation to an extent which is not negligible, the computer and control apparatus transmits a command to the drive of the hollow stirrer by way of the speed regulator to vary the speed of rotation as required so that the effective gas content will be kept constant.

A temperature measuring instrument connected to the computer and control apparatus by a pulse lead is also preferably provided. A pressure measuring instrument connected to the computer and control apparatus by a pulse lead is also preferably provided. Any changes in the operating temperature and pressure large enough to significantly affect the density and hence the gas content can thereby be taken into account by a variation in the speed of rotation.

According to one particular embodiment of the apparatus, the interface between the gas cushion and the region in which the component is situated is smaller than the cross sectional area of the region of the component at the level of the stirrer blades of the hollow stirrer. Diffusion between the gas cushion and the reactant is thereby almost completely eliminated. This reduction in the interface area may advantageously be obtained by using a floating lid covering the major part of the interface.

According to another embodiment producing the same effect, the gassing tank has a smaller diameter in the region of the liquid level than in the region of the stirrer blades of the hollow stirrer.

According to yet another embodiment, the stirrer shaft is covered in the region of the reactant by a sleeve fixed to the internal surface of the gassing tank. This sleeve prevents the formation of a funnel.

The filling level regulator preferably has two limiting value controls. The liquid level is kept constant between these limiting value controls which operate within a narrow interval.

Another embodiment is characterized in that the opening of the inlet pipe is in the form of a wide mouth. This results in a laminar, flat inflow which spreads out over the cross section of the gassing tank and continuously renews the uppermost layer of reactant so that a narrow range of residence times is ensured precisely in the region which is critical for avoiding diffusion. According to a variation of this embodiment, the opening of the supply duct consists of several openings distributed over the circumference of the gassing tank. If a sufficient number of such openings is provided, preferably distributed uniformly over the circumference, a flow in the radial direction towards the stirrer shaft is achieved before it dips down.

Another variation of the opening of the inflow duct consists of an annular distributor channel with overflow. Here again, a flow directed radially to the stirrer shaft is obtained due to the arrangement of the distributor channel on the internal circumference of the tank.

If further processing of the gas charged component is carried out continuously, as for example in the production of foam or the production of foam panels on double conveyor belts, the gassed component is continuously supplied to the mixing head by means of the dosing pump. In the case of an intermittent process, as for example when molds have to be filled, a small storage tank for the gassed reactant is arranged between the gassing tank and the mixing head, as already proposed in German Offenlegungsschrift No. 3,434,443. The gassed reactant in the storage tank may if necessary be circulated through the mixing head or through reversing valves upstream of the mixing head during periods of rest. When foam molding installations are operated in time with the gassing installation optimum operating conditions are obtained if the consumption of gassed component, viewed over the whole operating time, is equal to the quantity of gassed component supplied to the storage container, since in that case the gassing tank may be operated continuously.

An exemplary embodiment of the new apparatus with several modifications is shown purely schematically in the drawing and is described in more detail below.

In FIG. 1, a conduit 1 extends from a storage tank (not shown) to a mixing head (not shown) by way of a dosing pump (not shown). In this conduit 1, a gassing tank 2 is arranged between the storage tank and the dosing pump. The portion of conduit leading to the gassing tank 2 is the supply conduit marked by the reference 3 and the portion leading from the tank is the discharge conduit 4. The gassing tank 2 has a hollow stirrer 5 driven by a variable speed drive 6. The hollow stirrer 5 has a gas intake opening 8 operated by suction in the upper region of its stirrer shaft 7. Stirrer blades 9 provided with gas outlet openings 10 are provided at the end of the stirrer shaft 7 in the lower region of the gassing tank 2. A gas supply conduit 11 with shut off valve 12 opens into the upper region of the gassing tank 2. The liquid level 16 of reactant in the gassing tank 2 is kept constant by means of a filling level regulator 13 which has two limiting controls 14, 15. A gas cushion or gas layer 17 is situated above the liquid level 16. The hollow stirrer 5 sucks gas from this layer and disperses it in the reactant situated underneath it. The opening 18 of the supply conduit 3 is arranged just below the liquid level 16. The stirrer shaft 7 is covered by a sleeve 20 in the region of the layer 19 of ungassed component. This sleeve 20 is fixed to the inside of the gassing tank 2. The layer 21 of gassed component forms approximately from the level of the stirrer blades 9 downwards. Density measuring instruments 22 and 23 are arranged both in the supply conduit 3 and in the discharge conduit 4 and are connected to a computer and control apparatus 26 by pulse leads 24, 25. In addition, a temperature measuring instrument 27 and a pressure measuring instrument 28 are provided in the discharge conduit 4 and in the density meter 23 and are also connected to the computer and control apparatus 26 by pulse leads 29, 30. The filling level regulator 13 is also connected to the computer and control apparatus 26 by a pulse lead 31. A pulse lead 32 is connected to a servomotor 33 of the shut-off valve 12 for switching the filling level regulator 13 on and off. A pulse lead 34 extends from the computer and control apparatus 26 to the drive 6 of the hollow stirrer 5 by way of a speed control 35.

Figure 2:
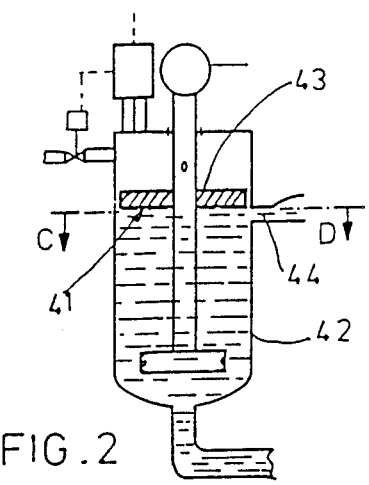
FIG. 2 is a section taken on the line A—B of FIG. 3, showing a modification of the opening of the supply duct for the components into the gassing tank.
Figure 3:
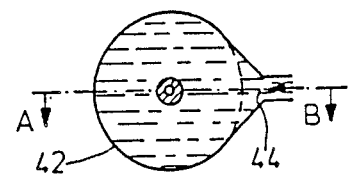
FIG. 3 represents a section taken on the line C—D of FIG. 2.

In FIGS. 2 and 3, the liquid level 41 of the reactant in the gassing tank 42 is covered by a floating lid 43. The opening 44 is in this case in the form of a wide mouth.

Figure 4:
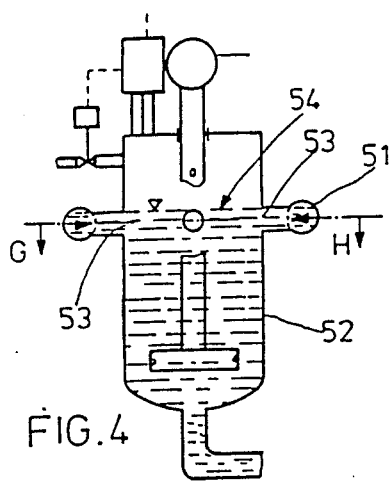
FIG. 4 represents a section taken on the line E—F of FIG. 5 of a second variation of the opening of the supply duct.
Figure 5:
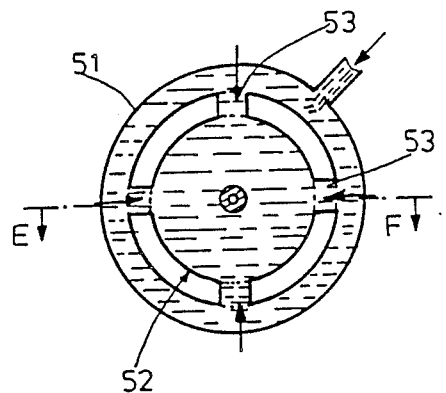
FIG. 5 represents a section taken on the line G—H of FIG. 4.

In FIGS. 4 and 5, openings 53 branch off at regular intervals from a ring duct 51 surrounding the gassing tank 52 and these openings enter the gassing tank 52 just below the liquid level 54.

Figure 6:
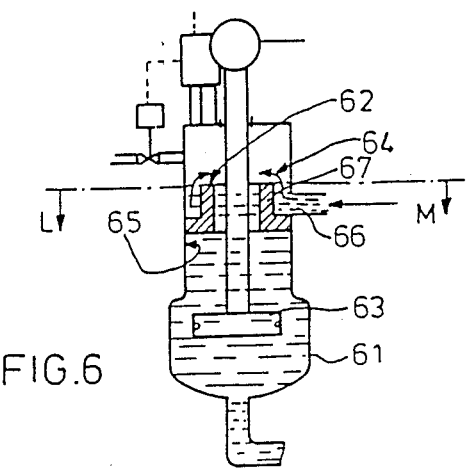
FIG. 6 represents a section taken on the line I—K of FIG. 7 of a third variation of the opening.
Figure 7:
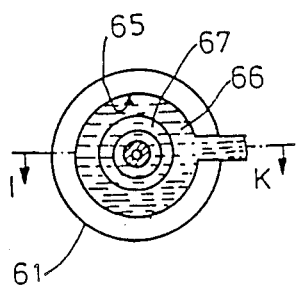
FIG. 7 represents a section taken on the line L—M of FIG. 6.

In FIGS. 6 and 7, the gassing tank 61 has a smaller diameter in the region of the liquid level 62 than in the region of the stirrer blades 63. The opening 64 is formed by a channel 66 with overflow 67 covering the internal wall 65 of the tank.

What is claimed is:

1. In a process for charging at least one liquid reactant with gas for the production of foams comprising continuously introducing the reactant into a gassing tank which is under pressure, maintaining a gas cushion in the upper region of said tank, passing gas from said upper region into the lower region of said tank via a hollow stirrer in said tank, said stirrer being provided with openings whereby gas passes into and is absorbed by said reactant, and removing the reactant charged with gas from said tank, the improvement wherein (i) the uncharged reactant is introduced into said gassing tank in a position as close as possible to and below the liquid level of the reactant, said liquid level being kept substantially constant, and the gas charged reactant is removed below the position where gas is introduced into said reactant: (ii) a three layered arrangement is thereby established in the gassing tank, so that the gas cushion is separated from the layer of gas charged reactant by a layer of uncharged reactant: and, (iii) a density corresponding to the desired gas content is maintained.

2. The process of claim 1, characterized in that the interface between the gas cushion and the ungassed reactant is kept as small as possible.

3. The process of claim 1, characterized in that the reactant is shielded against the rotations of the stirrer shaft.

4. The process of claim 1 characterized in that the ungassed reactant is introduced in such a manner that as far as possible the whole of the layer situated at the interface with the gas cushion is constantly replaced.

5. The process of claim 1, characterized in that the hollow stirrer is operated at speeds of up to a maximum of 1200 revolutions per minute.

6. The process of claim 1, characterized in that a stream produced only by the inflow and outflow and by the hollow stirrer but is otherwise undisturbed is maintained in the gassing tank.

7. The process according of claim 1, characterized in that the liquid level of the reactant in the gassing tank is kept constant at least between two limiting values by means of gas supply.

* * * * *